United States Patent
Fitzgerald et al.

(10) Patent No.: US 10,159,878 B2
(45) Date of Patent: Dec. 25, 2018

(54) COMPOSITE BALL BAT INCLUDING A BARREL WITH STRUCTURAL REGIONS SEPARATED BY A POROUS NON-ADHESION LAYER

(71) Applicant: EASTON DIAMOND SPORTS, LLC, Thousand Oaks, CA (US)

(72) Inventors: Stephen Bruce Fitzgerald, Halifax (CA); Frederic St. Laurent, Chelsea (CA)

(73) Assignee: EASTON DIAMOND SPORTS, LLC, Thousand Oaks, CA (US)

( * ) Notice: Subject to any disclaimer, the term of this patent is extended or adjusted under 35 U.S.C. 154(b) by 0 days.

(21) Appl. No.: 14/838,043

(22) Filed: Aug. 27, 2015

(65) Prior Publication Data
US 2017/0056736 A1    Mar. 2, 2017

(51) Int. Cl.
| | | |
|---|---|---|
| *A63B 59/54* | (2015.01) | |
| *B29C 37/00* | (2006.01) | |
| *B29C 70/48* | (2006.01) | |
| *B29D 23/00* | (2006.01) | |
| *B29K 105/08* | (2006.01) | |
| *B29L 31/52* | (2006.01) | |
| *B29L 23/00* | (2006.01) | |

(52) U.S. Cl.
CPC .......... *A63B 59/54* (2015.10); *B29C 37/0075* (2013.01); *B29C 70/48* (2013.01); *B29D 23/00* (2013.01); *A63B 2209/02* (2013.01); *B29K 2105/08* (2013.01); *B29L 2023/00* (2013.01); *B29L 2031/52* (2013.01)

(58) Field of Classification Search
CPC .......... A63B 2102/18; A63B 2102/182; A63B 59/50–59/58; A63B 2059/581; A63B 2209/023; A63B 2209/02
USPC ......................... 473/457, 519, 520, 564–568
See application file for complete search history.

(56) References Cited

U.S. PATENT DOCUMENTS

| | | | |
|---|---|---|---|
| 4,014,542 | A | 3/1977 | Tanikawa |
| 4,025,377 | A | 5/1977 | Tanikawa |
| 4,132,130 | A | 1/1979 | Fletcher |
| 4,150,291 | A | 4/1979 | Gulley |
| 4,505,479 | A | 3/1985 | Souders |

(Continued)

FOREIGN PATENT DOCUMENTS

| | | |
|---|---|---|
| CA | 2577184 C | 4/2014 |
| CN | 1067388 | 12/1992 |

(Continued)

OTHER PUBLICATIONS

ASTM International, Designation: F2219-14, Standard Test Methods for Measuring High-Speed Bat Performance, May 2016.

(Continued)

*Primary Examiner* — Mark Graham
(74) *Attorney, Agent, or Firm* — Perkins Coie LLP

(57) ABSTRACT

A composite ball bat or other sporting-good implement includes a handle and a barrel attached to or integral with the handle. The barrel has a wall including a first structural region and a second structural region between which a porous separation layer is positioned. The separation layer is at least partially coated with a release agent that prevents, or substantially prevents, adherence of the separation layer to at least one of the first or second structural regions.

16 Claims, 2 Drawing Sheets

(56) References Cited

U.S. PATENT DOCUMENTS

| | | |
|---|---|---|
| 4,604,319 A | 8/1986 | Evans |
| 4,804,315 A | 2/1989 | Ferris et al. |
| 4,818,584 A | 4/1989 | Eisenmann |
| 4,848,745 A | 7/1989 | Bohannan et al. |
| 4,867,399 A | 9/1989 | Therond |
| 4,963,408 A | 10/1990 | Huegli |
| 5,048,441 A | 9/1991 | Quigley |
| 5,057,353 A | 10/1991 | Maranci et al. |
| 5,301,940 A | 4/1994 | Seki et al. |
| 5,395,108 A | 3/1995 | Souders et al. |
| 5,415,398 A | 5/1995 | Eggiman |
| RE35,081 E | 11/1995 | Quigley et al. |
| 5,556,695 A | 9/1996 | Mazelsky |
| 5,641,366 A | 6/1997 | Hohman |
| 5,676,610 A | 10/1997 | Bhatt et al. |
| 6,010,417 A | 1/2000 | Young |
| 6,033,758 A | 3/2000 | Kocher et al. |
| 6,042,493 A | 3/2000 | Chauvin et al. |
| 6,053,828 A | 4/2000 | Pitsenberger |
| 6,265,333 B1 | 7/2001 | Dzenis et al. |
| 6,287,222 B1 | 9/2001 | Pitsenberger |
| 6,425,836 B1* | 7/2002 | Misono .............. B29C 70/088 |
| | | 473/566 |
| 6,634,969 B2 | 10/2003 | Forsythe |
| 6,663,517 B2 | 12/2003 | Chauvin |
| 6,723,012 B1 | 4/2004 | Sutherland |
| 6,723,127 B2 | 4/2004 | Ralph |
| 6,755,757 B2 | 6/2004 | Sutherland |
| 6,761,653 B1 | 7/2004 | Higginbotham et al. |
| 6,808,464 B1 | 10/2004 | Nguyen |
| 6,866,598 B2 | 3/2005 | Giannetti et al. |
| 6,872,156 B2 | 3/2005 | Ogawa |
| 6,997,826 B2 | 2/2006 | Sutherland |
| 7,006,947 B2 | 2/2006 | Tryon, III et al. |
| 7,087,296 B2 | 8/2006 | Porter |
| 7,115,054 B2* | 10/2006 | Giannetti ............... A63B 59/50 |
| | | 473/567 |
| 7,163,475 B2 | 1/2007 | Giannetti |
| 7,344,461 B2 | 3/2008 | Nguyen |
| 7,585,235 B2* | 9/2009 | Misono ................ A63B 59/50 |
| | | 473/566 |
| 7,699,725 B2 | 4/2010 | McNamee et al. |
| 7,857,719 B2 | 12/2010 | Giannetti et al. |
| 7,867,114 B2 | 1/2011 | Sutherland |
| 7,874,946 B2 | 1/2011 | Smith |
| 7,914,404 B2 | 3/2011 | Giannetti |
| 7,980,970 B2* | 7/2011 | Watari .................. A63B 59/50 |
| | | 473/566 |
| 8,182,377 B2* | 5/2012 | Chuang ................ A63B 59/50 |
| | | 473/567 |
| 8,282,516 B2 | 10/2012 | Chauvin et al. |
| 8,376,881 B2 | 2/2013 | Chuang |
| 8,512,174 B2* | 8/2013 | Epling ................. A63B 59/50 |
| | | 473/564 |
| 8,602,924 B2 | 12/2013 | Shindome |
| 8,708,845 B2 | 4/2014 | Chuang |
| 8,814,733 B2* | 8/2014 | Tsukamoto ............. B29C 63/34 |
| | | 473/566 |
| 8,979,682 B2 | 3/2015 | Chuang |
| 9,067,109 B2 | 6/2015 | Goodwin et al. |
| 9,149,697 B2 | 10/2015 | Epling et al. |
| 9,211,460 B2 | 12/2015 | Hayes et al. |
| 9,238,163 B2 | 1/2016 | Hayes et al. |
| 2002/0016230 A1 | 2/2002 | Okuyama |
| 2002/0098924 A1 | 7/2002 | Houser et al. |
| 2003/0153416 A1 | 8/2003 | Anderson |
| 2004/0132563 A1 | 7/2004 | Giannetti et al. |
| 2004/0132564 A1* | 7/2004 | Giannetti ............... A63B 59/50 |
| | | 473/567 |
| 2004/0176197 A1* | 9/2004 | Sutherland ............. A63B 59/50 |
| | | 473/564 |
| 2004/0209716 A1 | 10/2004 | Vacek et al. |
| 2005/0070384 A1* | 3/2005 | Fitzgerald ............. A63B 59/50 |
| | | 473/567 |
| 2005/0143203 A1 | 6/2005 | Souders et al. |
| 2006/0247078 A1 | 11/2006 | Giannetti et al. |
| 2006/0247079 A1 | 11/2006 | Sutherland et al. |
| 2007/0202974 A1 | 8/2007 | Giannetti |
| 2007/0205201 A1 | 9/2007 | Cundiff et al. |
| 2007/0219027 A1 | 9/2007 | Chong |
| 2008/0039241 A1 | 2/2008 | Pope |
| 2008/0070726 A1 | 3/2008 | Watari |
| 2009/0065299 A1 | 3/2009 | Vito et al. |
| 2009/0085299 A1 | 3/2009 | Shibayama |
| 2009/0181813 A1 | 7/2009 | Giannetti et al. |
| 2009/0215560 A1 | 8/2009 | McNamee et al. |
| 2009/0280935 A1 | 11/2009 | Watari |
| 2010/0160095 A1 | 6/2010 | Chauvin et al. |
| 2011/0165976 A1 | 7/2011 | Chuang et al. |
| 2011/0287875 A1 | 11/2011 | Vander Pol et al. |
| 2013/0316859 A1 | 11/2013 | Burger |
| 2014/0080642 A1* | 3/2014 | Epling ................... A63B 59/06 |
| | | 473/564 |
| 2014/0213395 A1 | 7/2014 | Chuang |
| 2015/0018139 A1* | 1/2015 | Slater .................... A63B 59/54 |
| | | 473/567 |

FOREIGN PATENT DOCUMENTS

| | | |
|---|---|---|
| CN | 2684892 Y | 3/2005 |
| EP | 0585965 A1 | 3/1994 |
| WO | 2004062734 | 7/2004 |
| WO | 2006015160 | 9/2006 |
| WO | 2011084847 A1 | 7/2011 |
| WO | 2013101465 | 7/2013 |

OTHER PUBLICATIONS

IP Australia, "Patent Examination Report No. 1", for AU2012362912, dated Nov. 18, 2016.
Japanese Patent Office, "Office Action", for JP2014-550320, with English translation, dated Oct. 25, 2016.
State Intellectual Property Office, China PRC, "First Office Action", for CN201280064601.8 with English translation, dated Aug. 18, 2015.
Taiwan Intellectual Property Office, Official Letter and Search Report for TW101148678, with English Translation, dated Jul. 12, 2016.
USPTO, Search Report and Written Opinion for PCT/US2010/062083, dated Apr. 6, 2011.
USPTO, Search Report and Written Opinion for PCT/US2012/069268, dated Apr. 15, 2013.
Global Plastic Sheeting, "GPS Diamond Scrim," available at https://www.globalplasticsheeting.com/gps-diamond-scrim-30-36-45-lldpe, exact publication date unknown, website visited Dec. 27, 2017.
Global Plastic Sheeting, "Poly Scrim Crawl Space Vapor Barriers," available at https://www.globalplasticsheeting.com/ultra-scrim-crawl-space-vapor-barriers, exact publication date unknown, website visited Dec. 27, 2017, 3 pgs.
Canadian Intellectual Property, Office, "Search Report and Written Opinion", for PCT/CA2016/051007, dated Nov. 3, 2016, 8 pgs.

* cited by examiner

COMPOSITE BALL BAT INCLUDING A BARREL WITH STRUCTURAL REGIONS SEPARATED BY A POROUS NON-ADHESION LAYER

BACKGROUND

Ball bats and other sporting-good implements are often made from composite materials. Composite components are generally formed from at least one layer of a fibrous material, such as carbon or fiberglass, which is coated in a matrix material, such as a resin, and cured to form a hardened structural material. One known method of forming composite components involves stacking or laying up multiple layers that have been pre-impregnated with resin, and curing the assembly with heat (often called a "pre-preg" process). Another known method of forming composite components is resin-transfer molding ("RTM"). RTM methods typically include providing a layer of fibrous material in a mold, injecting a resin material into the mold to saturate the fiber material, and using heat to cure the resin-coated fiber into the hardened composite layer. Composite manufacturing methods require substantially uniform resin flow during the injection or curing process to ensure structural uniformity. They also often require dedicated tooling molds that can be expensive to modify or replace.

For most players, a ball bat generally has a better feel and higher performance when the barrel exhibits a relatively low compression. Lower compression may result in a composite bat, for example, from forming the bat with multiple concentric walls or layers. Such walls or layers are typically molded separately and assembled together after molding, or they can be laid up with layers of polymer or plastic sheeting to separate the composite layers. But these existing techniques often require significant tooling costs or production steps that can complicate the manufacturing process. For example, when using polymer sheets to separate layers in composite-laminate walls, resin generally flows along one side of the polymer sheet to a greater extent than the other side—rarely evenly distributing along both sides—resulting in an incomplete and undesirable distribution of resin.

Bats may also have improved feel when they include some form of damping to lessen vibrations resulting from impact with a ball. During a typical impact, a bat momentarily flattens or flexes at the site of impact, followed by repeated oval-shaped oscillations after the impact. Damping elements have typically been located at the barrel-handle connection, or at the knob end of a ball bat. A rubber connector positioned between a handle and a barrel, for example, can be used to absorb some of the energy resulting from post-impact oscillations. Damping may also contribute to lower batted-ball speeds to facilitate a bat's compliance with regulatory association standards.

SUMMARY

A composite ball bat or other sporting-good implement includes a handle and a barrel attached to or integral with the handle. The barrel has a wall including a first structural region and a second structural region between which a porous separation layer is positioned. The separation layer is at least partially coated with a release agent that prevents, or substantially prevents, adherence of the separation layer to at least one of the first or second structural regions. Other features and advantages will appear hereinafter. The features described herein may be used separately or together, or in various combinations of one or more of them.

BRIEF DESCRIPTION OF THE DRAWINGS

In the drawings, wherein the same reference number indicates the same element throughout the views.

DETAILED DESCRIPTION

The present technology is generally directed to composite ball bats having at least one porous damping and separation layer, and methods for manufacturing such composite ball bats. Various embodiments of the technology will now be described. The following description provides specific details for a thorough understanding and enabling description of these embodiments. One skilled in the art will understand, however, that the invention may be practiced without many of these details. Additionally, some well-known structures or functions may not be shown or described in detail so as to avoid unnecessarily obscuring the relevant description of the various embodiments. Accordingly, the technology may include other embodiments having additional elements or omitting elements described below with reference to FIGS. 1-2.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list. Further, unless otherwise specified, terms such as "attached" or "connected" are intended to include integral connections, as well as connections between physically separate components.

Specific details of certain embodiments of the present technology are described herein with reference to baseball or softball. The technology may also be used in other sporting-good implements, such as hockey blades or shafts, tennis rackets, or cricket bats.

The present technology is generally directed to a composite ball bat having improved performance or feel, at least in part through the provision of a porous layer that separates structural composite layers of the bat to allow for relative motion between the layers and frictional dissipation of energy. Examples of this technology are illustrated in the included figures and described herein.

Figure 1:
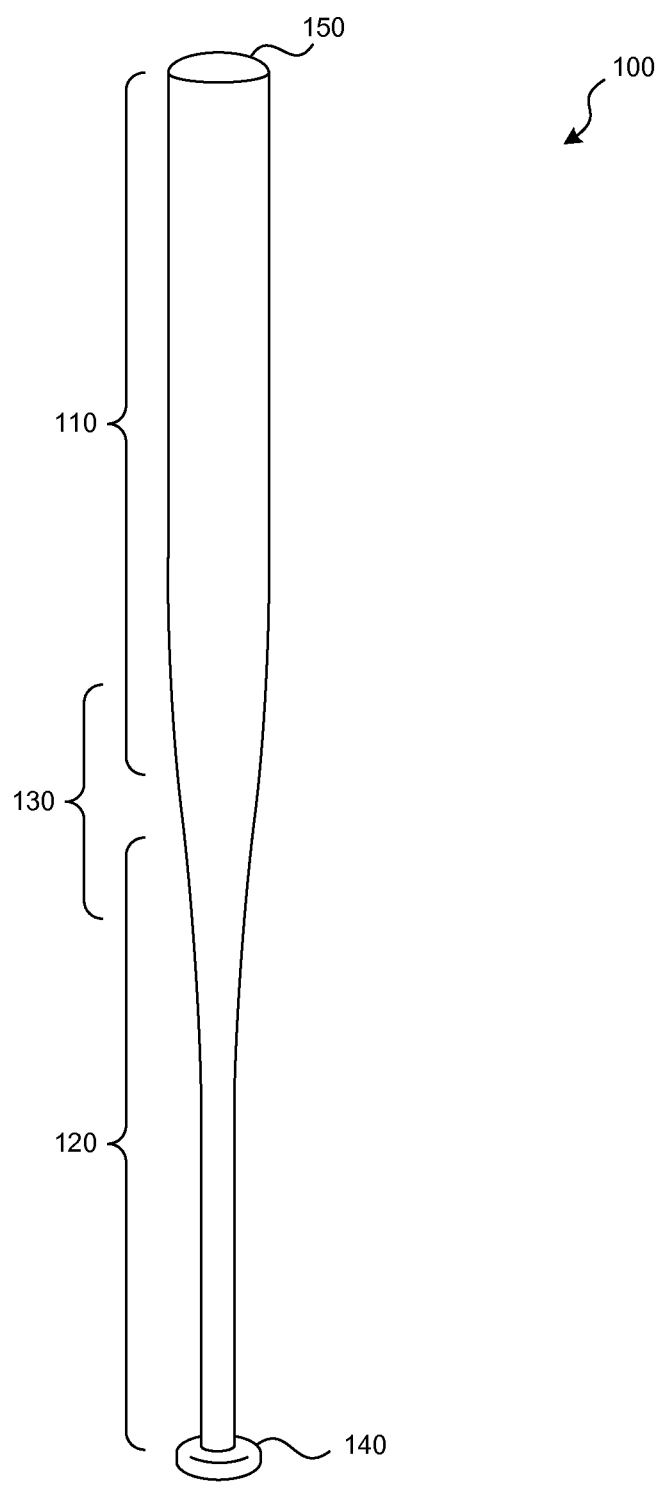
FIG. 1 is a perspective view of a ball bat in accordance with an embodiment of the present technology.

Turning now to the drawings, as shown in FIG. 1, a baseball or softball bat 100, hereinafter collectively referred to as a "ball bat" or "bat," includes a barrel region 110 and a handle region 120. There may be a transitional or taper region 130 in which the larger diameter of the barrel region 110 transitions to the narrower diameter of the handle region 120. The handle region 120 may include an end knob 140, and the barrel region 110 may be closed with a suitable end cap 150. The ball bat 100 may be a one-piece construction or may include two or more separate attached pieces (e.g., a separate handle and barrel). In other embodiments, the technology may be used in other sporting-good implements that may have generally different shapes or forms.

The ball bat 100 may be constructed from one or more composite materials or other suitable materials, as further described below. Some examples of suitable composite materials include a resin or other matrix material reinforced with fibers of glass, graphite, boron, carbon, aramid, ceramic, Kevlar, or Astroquartz®.

The ball bat 100 may have any suitable dimensions. The bat 100 may have an overall length of 20 to 40 inches, or 26 to 34 inches. The overall barrel diameter may be 2.0 to 3.0 inches, or 2.25 to 2.75 inches. Typical ball bats have diameters of 2.25, 2.625, or 2.75 inches. Bats having various combinations of these overall lengths and barrel diameters, or any other suitable dimensions, are contemplated herein. The specific preferred combination of bat dimensions is generally dictated by the user of the bat 100, and may vary greatly between users.

The inventors found that existing resin-transfer-molding ("RTM") tooling designed for single-wall or single-layer composite bats would not accommodate a wall thickness required to manufacture a traditional multi-wall bat. Rather than purchase new and expensive RTM tooling to accommodate such a wall thickness, the inventors discovered that the existing tooling could be used to effectively create a multi-wall bat with generally the same amount of effort required to mold a single-wall bat. For example, the inventors discovered that a porous separation layer of fiber coated with a release agent could be positioned between the structural layers in the RTM tooling mold. The release agent prevents, or substantially prevents, bonding of the separation layer to the resin used in the structural composite layers, while the porous nature of the fibrous separation layer (as opposed to a polymer or impermeable layer) allows the resin to pass through the separation layer during the RTM process, allowing free flow and uniform distribution of the resin.

Figure 2:
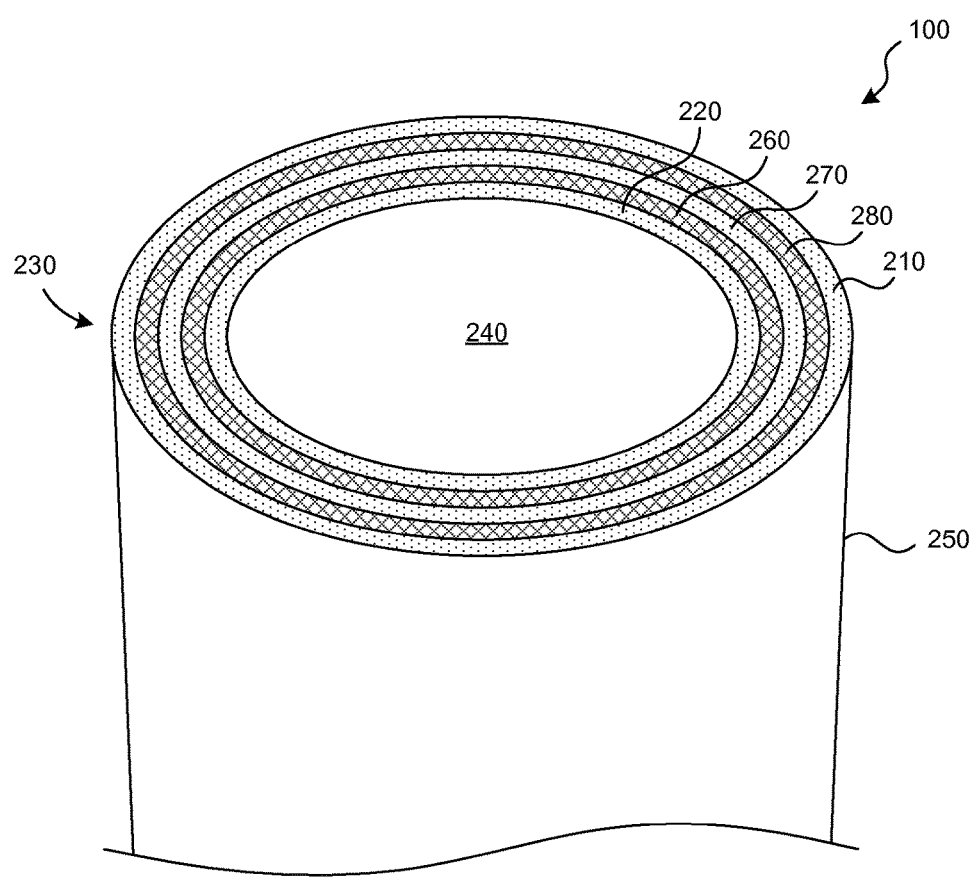
FIG. 2 is a cross-sectional view of a bat barrel including porous damping and separation layers in accordance with an embodiment of the present technology.

FIG. 2 illustrates a cross-section of a barrel portion of a composite ball bat 100 in accordance with an embodiment of the present technology. In the illustrated embodiment, an exterior composite structural layer 210 and an interior composite structural layer 220 form boundaries of the barrel wall 230. In the illustrated embodiment, structural layer 220 is proximate to a hollow interior region 240 of the ball bat 100, while structural layer 210 forms a hitting surface 250 of the ball bat 100. The barrel wall 230 may include one or more additional structural layers, as described below.

In the illustrated embodiment, a first separation layer 260 is positioned between the interior composite structural layer 220 and a central composite structural layer 270. A second separation layer 280 is positioned between the central composite structural layer 270 and the exterior composite structural layer 210. In other embodiments, two composite structural layers or regions may be separated by a single separation layer to form a barrel wall, or there may be more than two separation layers positioned in alternating fashion between multiple composite structural layers. Any suitable number of structural layers and separation layers may be used to form the barrel wall 230. The barrel wall 230 may include the hitting surface 250 of the ball bat 100, or the structural arrangements described herein may be located internally to a separate hitting surface.

The composite structural layers 210, 220, 270 may each include a fibrous ply or mat coated in a matrix, such as a resin, that hardens upon curing. The separation layers 260, 280 may each include a fibrous ply or mat coated in a release agent to resist adhesion of the separation layers to the composite structural layers 210, 220, 270. The release agent may be silicone-based, mineral-based, or it may be of other varieties suitable for resisting adhesion between the separation layers 260, 280 and the resin in the composite layers 210, 220, 270. The coated separation layers 260, 280 provide for relative motion and frictional dissipation of energy between the composite structural layers 210, 220, 270 in the barrel wall 230.

In some embodiments, the separation layers 260, 280 may be formed from fiberglass, carbon fiber, natural fibers, or other suitable fibers. Also, in some embodiments, the fibers in the separation layers 260, 280 may be braided, woven, entangled, randomly arranged, or uniform, or the separation layers 260, 280 may have other suitable arrangements of fibers. For example, the fibers may be oriented at one or more suitable angles to impart a desired amount of frictional dissipation during impact. In other embodiments, one or more separation layers may be formed of a porous, non-stick material, such as a perforated sheet of a fluoropolymer material, such as Teflon®.

Through molding and curing, each separation layer 260, 280 becomes an entangled layer of fibers and cured (but un-bonded) resin particles that effectively separate the laminate into distinct walls or layers. The entangled fibers and loose resin particles in each separation layer slide against each other and tangle with each other when the laminate in the barrel wall 230 is flexed or strained. The friction between the fibers and the resin particles creates damping between the layers, and improves feel and impact sound. The separation layers 260, 280 may make little contribution, if any, to the overall rigidity or structural integrity of the laminate because they are generally non-structural and may carry little to no load, as opposed to the composite structural layers (e.g., 210, 220, 270) that form the loaded structure of the wall 230.

In assembly, one or more of the separation layers 260, 280 may be wet-out or saturated with the release agent to generally coat the fibers in each separation layer. Any excess release agent may be squeezed from the separation layers. Each separation layer may be dried before placement into the RTM mold to resist flow of the release agent into the fibers of the composite structural layers 210, 220, 270, or to resist mixture of the release agent with the resin during the injection or molding process. The separation layers 260, 280 may be sandwiched between the composite structural layers 220, 270, 210 in the RTM mold before the resin is poured or injected into the mold and then cured.

Because of the presence of the release agent, the poured or injected resin will pass through the porous separation layers 260, 280 to distribute evenly around the structural fibers without bonding to the separation layers. In practice, a small amount of resin may cure within the separation layers 260, 280 but it will generally fail to bond to the separation layers, thus creating separate structural regions on either side of each separation layer. Accordingly, the present technology allows manufacture of what amounts to a multi-wall bat using traditional single-wall production techniques and equipment.

The separation layers 260, 280 may have any suitable thickness. For example, each separation layer may be 0.005 to 0.040 inches thick to allow efficient separation of the structural layers, while providing relative motion and frictional dissipation of forces and vibrations between the layers.

Although the technology has been described with respect to RTM processes, the separation layers (e.g., 260, 280) may be used in a pre-preg lamination process. In such a process, the matrix or resin content of the pre-preg, structural materials would need to be high enough to account for the resin that may flow into the porous separation layer. As described above, the porous separation layer allows resin to pass through it, permitting uniform distribution of resin.

From the foregoing, it will be appreciated that specific embodiments of the disclosed technology have been described for purposes of illustration. Various modifications may be made without deviating from the technology, however, and elements of certain embodiments may be interchanged with those of other embodiments. For example, bats may be made from different numbers of composite structural layers and porous damping or separation layers. In some embodiments, the one or more porous separation layers may be formed using fibers having inherent non-stick properties (e.g., Teflon® fibers) relative to the resin used in the composite structural layers, in addition to or in lieu of the use of a release-agent coating. The technology may also be used in other sporting-good implements, such as hockey blades or sticks, to provide damping and improved feel, among other advantages.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A composite ball bat, comprising:
   a handle;
   a barrel attached to or integral with the handle, the barrel comprising a wall including a first structural region and a second structural region; and
   a porous separation layer positioned between the first and second structural regions, wherein the porous separation layer comprises porous material saturated with a release agent that resists adherence of the porous separation layer to a matrix material in at least one of the first or second structural regions, and wherein at least some of the matrix material is positioned in the porous separation layer between the first structural region and the second structural region.

2. The composite ball bat of claim 1 wherein:
   the first structural region comprises a first fibrous mat at least partially coated with a first matrix material;
   the second structural region comprises a second fibrous mat at least partially coated with a second matrix material; and
   the porous separation layer comprises a third fibrous mat.

3. The composite ball bat of claim 1 wherein the porous separation layer comprises at least one of fiberglass, carbon fibers, polymer fibers, or natural fibers.

4. The composite ball bat of claim 1 wherein the porous separation layer is formed from fibers positioned in a braided or woven arrangement.

5. The composite ball bat of claim 1 wherein the release agent comprises silicone.

6. The composite ball bat of claim 1 wherein the porous separation layer has a thickness between approximately 0.005 inches and 0.040 inches.

7. The composite ball bat of claim 1 wherein the porous separation layer is a first separation layer, the ball bat further comprising:
   a third structural region; and
   a second separation layer positioned between the second and third structural regions.

8. A sporting-good implement, comprising:
   a wall including a plurality of composite structural layers, each composite structural layer including a matrix material; and
   a separation layer positioned between two of the composite structural layers, wherein the separation layer comprises porous material saturated with a release agent configured to resist adherence to the matrix material; and wherein the separation layer is porous and at least some of the matrix material is positioned in the separation layer between two of the composite structural layers.

9. The sporting-good implement of claim 8 wherein the sporting-good implement comprises a ball bat, and wherein the wall includes a portion of a barrel region of the ball bat.

10. The sporting-good implement of claim 8 wherein at least one of the composite structural layers includes a pre-preg material.

11. The sporting-good implement of claim 8 wherein the matrix material comprises a resin.

12. The sporting-good implement of claim 8 wherein the separation layer comprises at least one of fiberglass, carbon fibers, polymer fibers, or natural fibers.

13. The sporting-good implement of claim 8 wherein the release agent comprises silicone.

14. The sporting-good implement of claim 8 comprising three composite structural layers separated by two separation layers.

15. The sporting-good implement of claim 8 wherein the separation layer includes fibers in a braided or woven arrangement.

16. The sporting-good implement of claim 8 wherein the separation layer includes fibers in a generally random arrangement.

\* \* \* \* \*